United States Patent
Arnold et al.

(10) Patent No.: US 11,939,039 B2
(45) Date of Patent: Mar. 26, 2024

(54) AIRCRAFT DOOR DRAINAGE SYSTEM

(71) Applicant: FEDERAL EXPRESS CORPORATION, Memphis, TN (US)

(72) Inventors: Matthew Alan Arnold, Hernando, MS (US); Brittany M. Govan, Memphis, TN (US); Muhammad Jamal, Cordova, TN (US); Danny Jay Reed, Walls, MS (US); Ronald Wayne Thomas, Collierville, TN (US); John Alan Yerger, Memphis, TN (US)

(73) Assignee: FEDERAL EXPRESS CORPORATION, Memphis, TN (US)

( * ) Notice: Subject to any disclaimer, the term of this patent is extended or adjusted under 35 U.S.C. 154(b) by 958 days.

(21) Appl. No.: 16/946,247

(22) Filed: Jun. 12, 2020

(65) Prior Publication Data

US 2021/0387712 A1    Dec. 16, 2021

(51) Int. Cl.
*B64C 1/14* (2006.01)
*B33Y 50/02* (2015.01)
*B33Y 80/00* (2015.01)

(52) U.S. Cl.
CPC ........... *B64C 1/1461* (2013.01); *B33Y 50/02* (2014.12); *B64C 1/1415* (2013.01); *B33Y 80/00* (2014.12)

(58) Field of Classification Search
CPC ..... B64C 1/1461; B64C 1/1407; B64C 1/066; E06B 7/14; B60J 5/0494; B60J 7/0084; B60J 5/0431

See application file for complete search history.

(56) References Cited

U.S. PATENT DOCUMENTS

2014/0102004 A1* 4/2014 Drifka ................. E06B 9/17046
                                                               49/377
2018/0119482 A1* 5/2018 Chang ....................... E06B 9/68

FOREIGN PATENT DOCUMENTS

JP          H0538280 U1 *  5/1993  ............... E06B 7/14

* cited by examiner

*Primary Examiner* — Brady W Frazier
*Assistant Examiner* — Shanna Danielle Glover
(74) *Attorney, Agent, or Firm* — Finnegan, Henderson, Farabow, Garrett & Dunner, LLP

(57) ABSTRACT

An aircraft door drainage system includes a precipitation receptacle disposed longitudinally along an upper edge of an aircraft door opening. The receptacle is mounted along the upper edge of the door opening by a plurality of brackets that connect the receptacle to an inside ceiling panel of the aircraft. The receptacle protrudes outward from the upper edge of the door opening into a path followed by precipitation falling off of an outer peripheral surface of a fuselage of the aircraft from locations above, forward, and aft of the door opening into the door opening when the aircraft door is in an open position. The receptacle remains clear of the aircraft door when the aircraft door is closed into the door opening. Drain hoses are connected at first and second ends of the receptacle to direct precipitation collected in the receptacle to an outside of the aircraft.

20 Claims, 9 Drawing Sheets

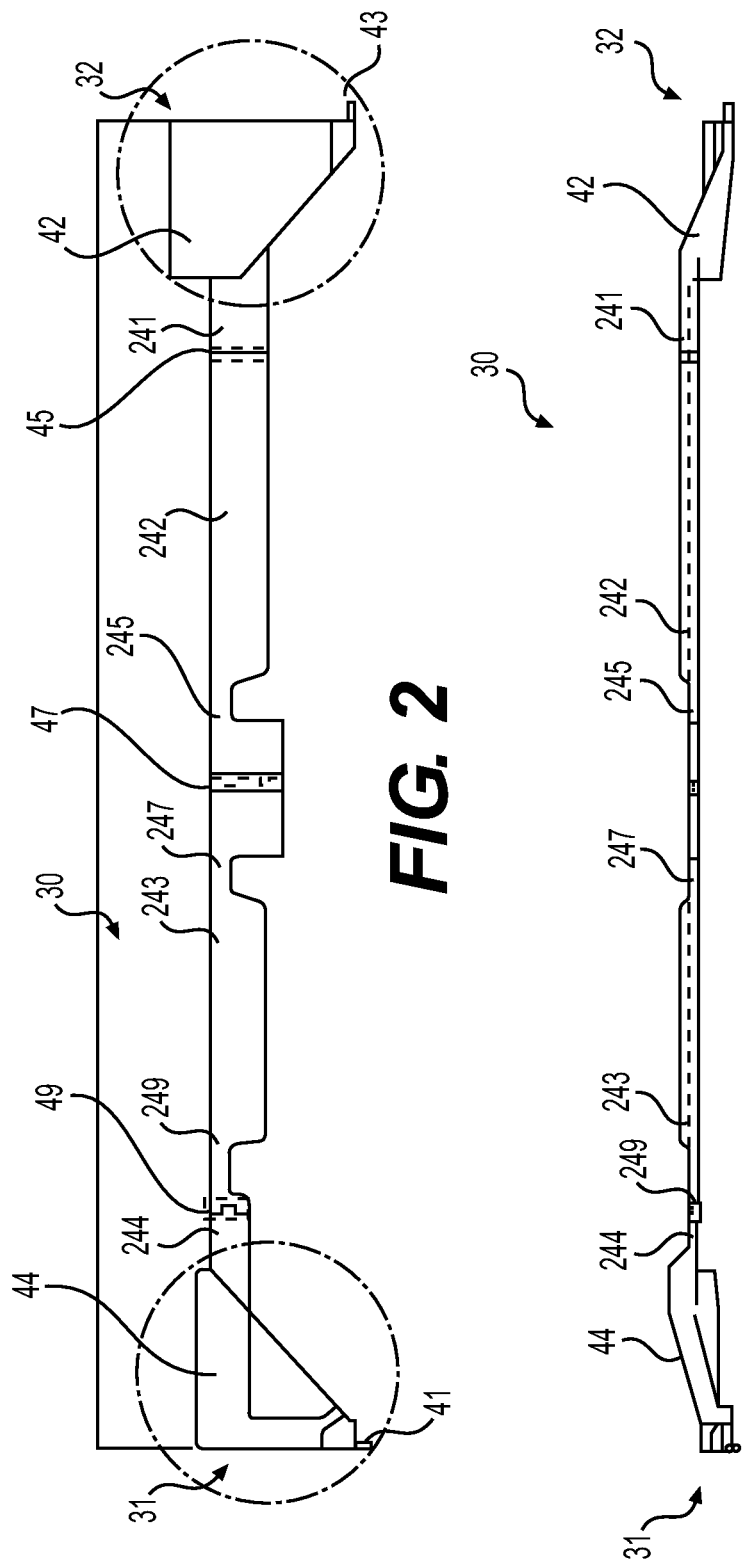

AIRCRAFT DOOR DRAINAGE SYSTEM

FIELD

The present application relates to a precipitation drainage system, and in particular, to an aircraft door precipitation drainage system. The disclosure includes systems and methods for capturing precipitation along a hinge area of an aircraft cargo door and routing the precipitation through hoses at the forward and aft corners of the cargo door opening.

BACKGROUND

Existing cargo aircraft include an opening in a side of a fuselage of the aircraft for loading cargo into a cargo compartment inside the fuselage, and a cargo door configured to open and close the opening. The cargo door is often hinged along an upper edge of the cargo door to an upper edge of the opening in the fuselage. When the cargo door is opened during loading and unloading of the aircraft, precipitation can run off the outer peripheral surface of the fuselage from locations above, forward, and aft of the hinged interface between the cargo door and the cargo door opening and enter the cargo compartment, thus potentially causing flooding and damage to the cargo and to the cargo compartment.

The aircraft door precipitation drainage system according to the present disclosure is directed towards capturing precipitation that would otherwise enter the cargo compartment through the cargo door opening and diverting the precipitation to the outside of the aircraft, thus overcoming one or more of the problems set forth above and/or other problems of the prior art.

SUMMARY

An aspect of the present disclosure is directed to an aircraft door precipitation drainage system. The aircraft door precipitation drainage system may include a precipitation receptacle disposed longitudinally along an upper edge of an aircraft door opening. The precipitation receptacle may be mounted in place along the upper edge of the door opening by a plurality of brackets spaced along a length of the receptacle and configured to connect the receptacle to an inside ceiling panel of the aircraft. The receptacle may be configured to protrude outward from the upper edge of the door opening into the door opening when the aircraft door is in an open position. The receptacle may also be configured to remain clear of the aircraft door when the aircraft door is closed into the door opening. At least one drain hose may be connected at one of a first end or a second end of the receptacle and configured to direct at least a portion of the precipitation collected in the receptacle to an outside of the aircraft.

Another aspect of the present disclosure is directed to a precipitation gutter disposed along an upper edge of an aircraft door opening for capturing and diverting precipitation falling off of an outer peripheral surface of a fuselage of the aircraft from above the aircraft door opening into the opening when the door is in an open position. The precipitation gutter may include a receptacle disposed longitudinally along the upper edge of the aircraft door opening, the receptacle being mounted in place along the upper edge of the door opening by a plurality of brackets spaced along a length of the receptacle and configured to connect the receptacle to an inside structural member of the aircraft. The receptacle may be configured to protrude outward from the upper edge of the door opening. The receptacle may also be configured to remain clear of the aircraft door when the aircraft door is closed into the door opening.

Yet another aspect of the present disclosure is directed to an aircraft including a cargo door opening in a side of a fuselage of the aircraft, and a cargo door configured to close and open the cargo door opening. A precipitation drainage system may be mounted along an upper edge of the cargo door opening. The precipitation drainage system may include a precipitation receptacle disposed longitudinally along the upper edge of the cargo door opening. The precipitation receptacle may be mounted in place along the upper edge of the cargo door opening by a plurality of brackets spaced along a length of the receptacle and configured to connect the receptacle to an inside structural member of a cargo compartment of the aircraft. The receptacle may be configured to protrude outward from the upper edge of the cargo door opening when the cargo door is in an open position. The receptacle may also be configured to remain clear of the cargo door when the cargo door is closed into the cargo door opening. The precipitation drainage system of the aircraft may include at least one drain hose connected at one of a first end or a second end of the receptacle and configured to direct at least a portion of the precipitation collected in the receptacle to an outside of the aircraft.

A still further aspect of the present disclosure is directed to a method of creating a computer-readable three-dimensional model suitable for use in manufacturing a precipitation gutter or a section of the precipitation gutter used in an aircraft door precipitation drainage system. The method may include inputting data representing the precipitation gutter or the section of the precipitation gutter to a computer, and using the data to represent the precipitation gutter or the section of the precipitation gutter as a three-dimensional model, the three dimensional model being suitable for use in manufacturing the precipitation gutter or the section of the precipitation gutter.

Another aspect of the present disclosure is directed to a method for manufacturing a precipitation gutter or a section of a precipitation gutter used in an aircraft door precipitation drainage system. The method may include the steps of providing a computer-readable three-dimensional model of the precipitation gutter or a section of the precipitation gutter, the three-dimensional model being configured to be converted into a plurality of slices that each define a cross-sectional layer of the precipitation gutter, and successively forming each layer of the precipitation gutter or the section of the precipitation gutter by additive manufacturing.

BRIEF DESCRIPTION OF THE DRAWINGS

FIG. 2 is a plan view of a precipitation receptacle according to an exemplary embodiment of the present disclosure;

FIG. 3 is a side view of the exemplary embodiment of the precipitation receptacle shown in FIG. 2;

DETAILED DESCRIPTION

Figure 1:
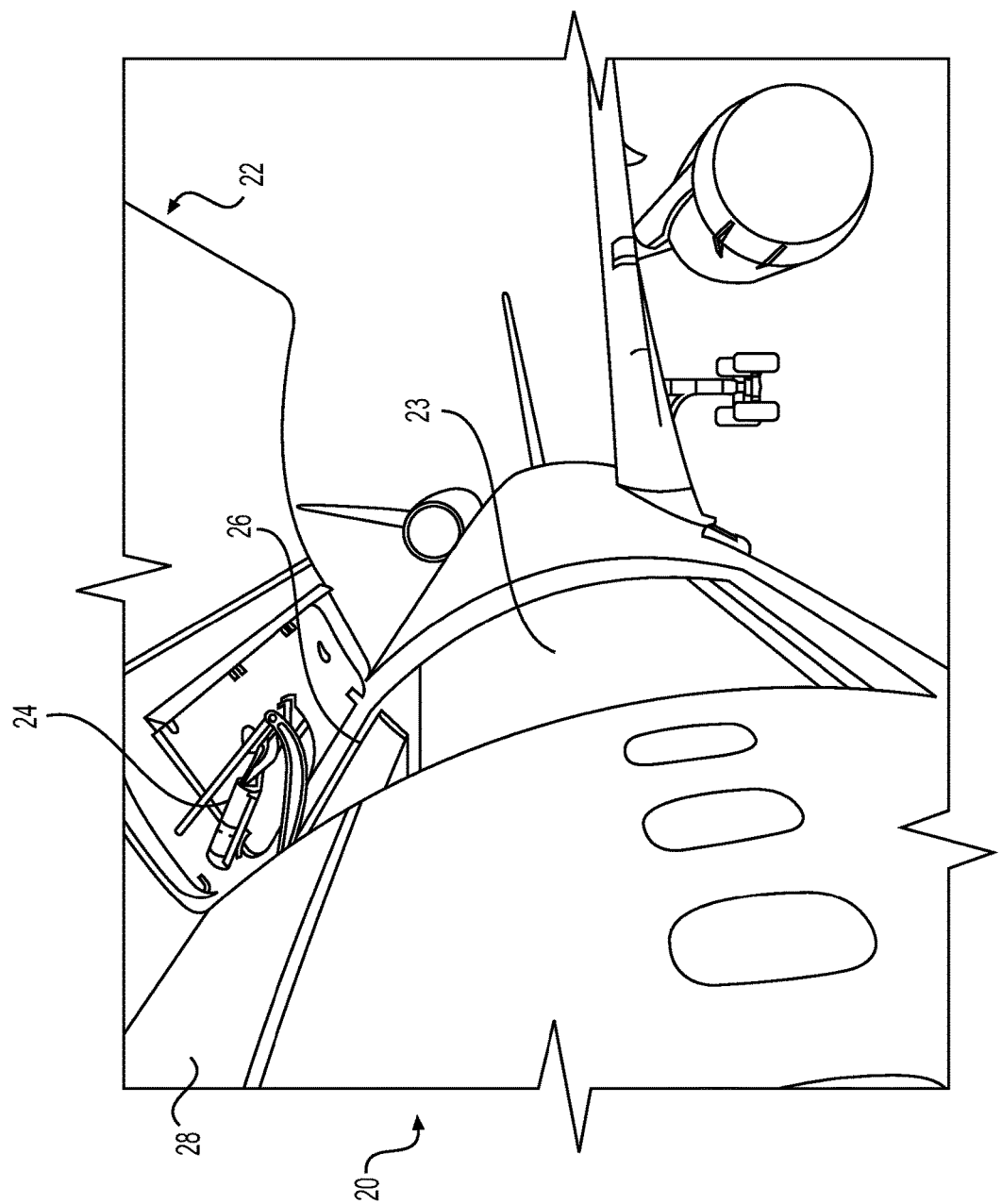
FIG. 1 is a perspective view of an exemplary cargo door opening and cargo door in an aircraft that may include an aircraft door precipitation drainage system according to this disclosure.

FIG. 1 depicts a typical cargo aircraft 20 with a cargo loading opening 23 in a side of a fuselage 28 of aircraft 20, and a cargo door 22 connected by a hinge 24 along an upper edge 26 of cargo door opening 23. Cargo door 22 is configured to open and close cargo door opening 23. When in an open position, such as shown in FIG. 1, precipitation may fall from an outer peripheral surface of fuselage 28 into cargo door opening 23 along the hinged interface between cargo door 22 and upper edge 26 of cargo door opening 23, potentially flooding the cargo compartment and damaging cargo being loaded into the cargo compartment. Depending on the position of the aircraft when loading and unloading through cargo door opening 23, precipitation may also run off from fuselage 28 into cargo door opening 23 from forward and aft of cargo door 22 near the hinged interface between cargo door 22 and upper edge 26 of cargo door opening 23.

Figure 4:
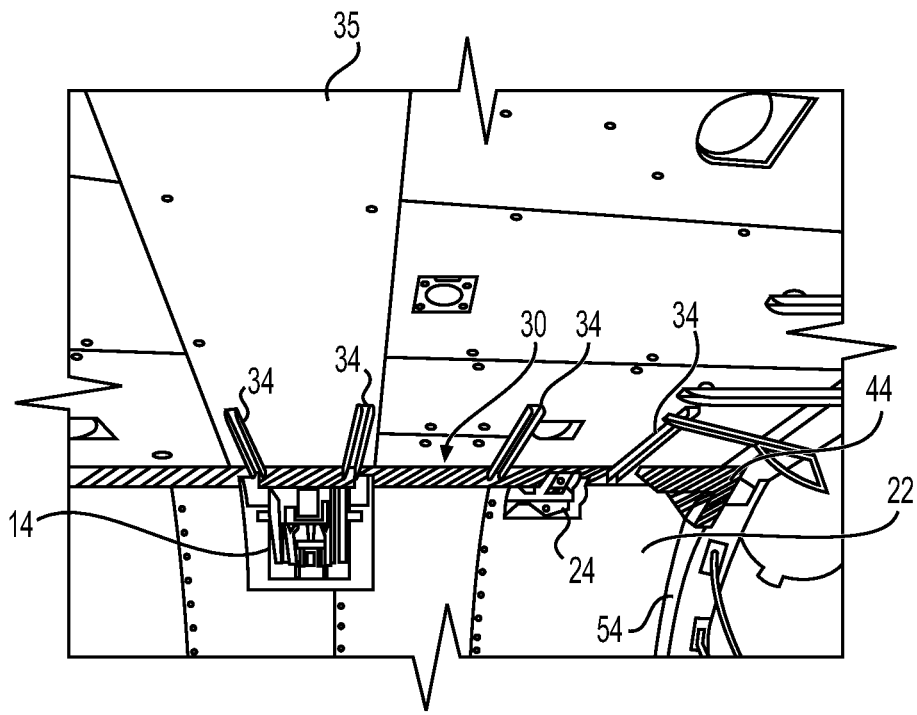
FIG. 4 is an illustration of a forward portion of the precipitation receptacle of FIGS. 2 and 3 mounted in an aircraft such as the aircraft shown in FIG. 1.
Figure 5:
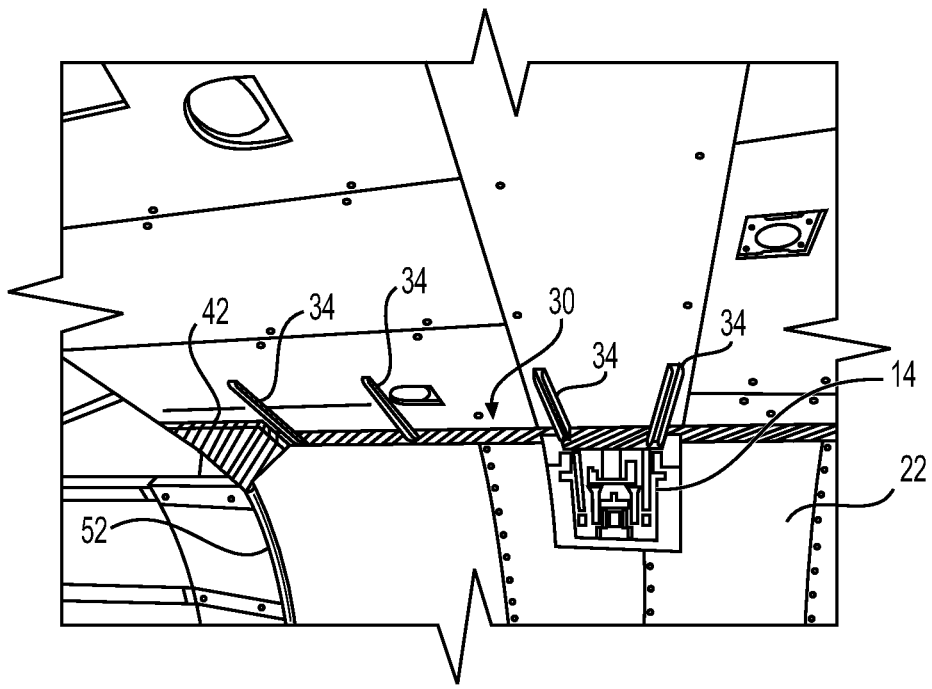
FIG. 5 is an illustration of an aft portion of the precipitation receptacle of FIGS. 2 and 3.
Figure 6:
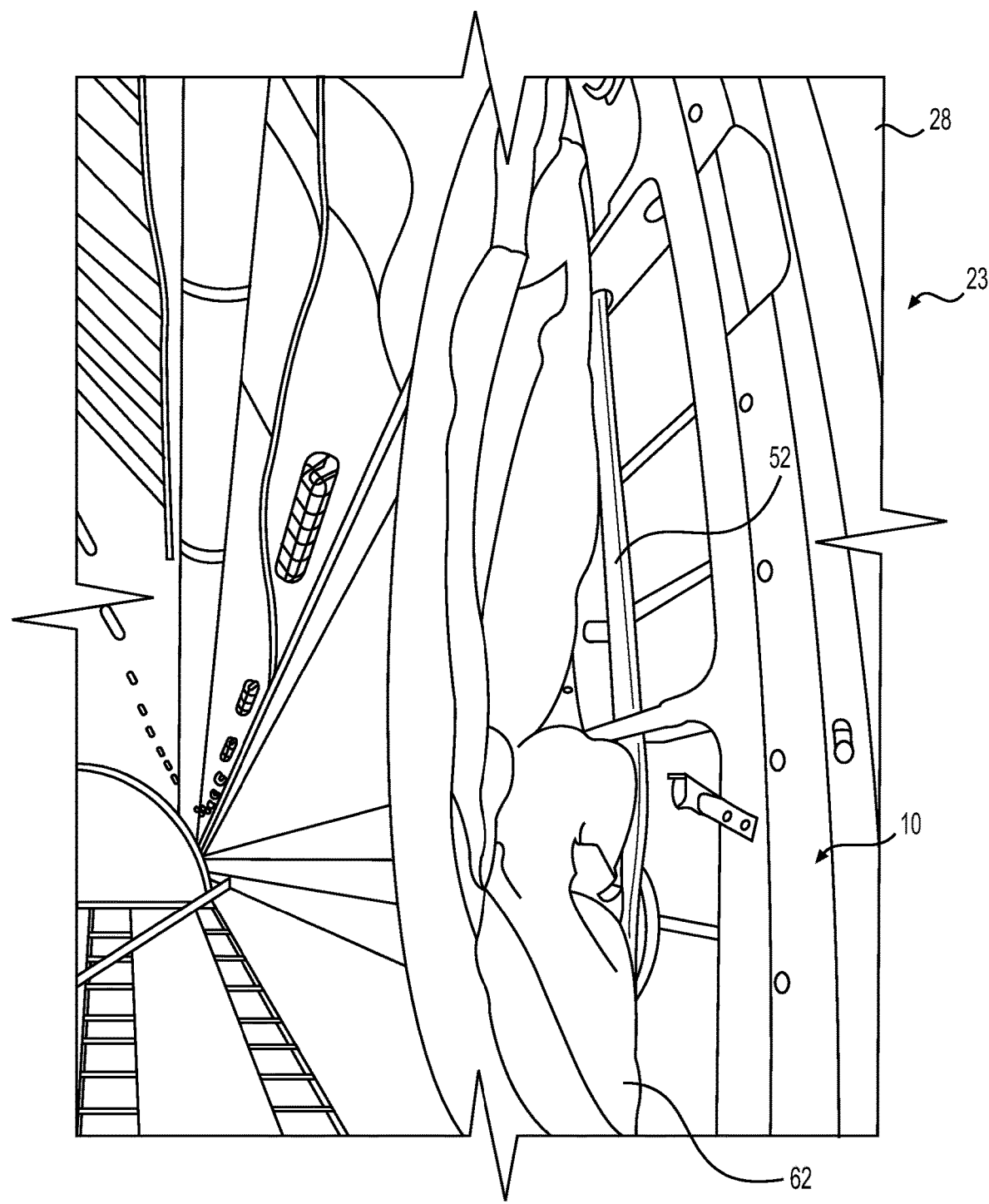
FIG. 6 is a schematic view of a portion of a drain hose leading from the precipitation receptacle of FIGS. 2 and 3, and directed behind a composite cloth used to protect a side of a cargo compartment in an aircraft.
Figure 7:
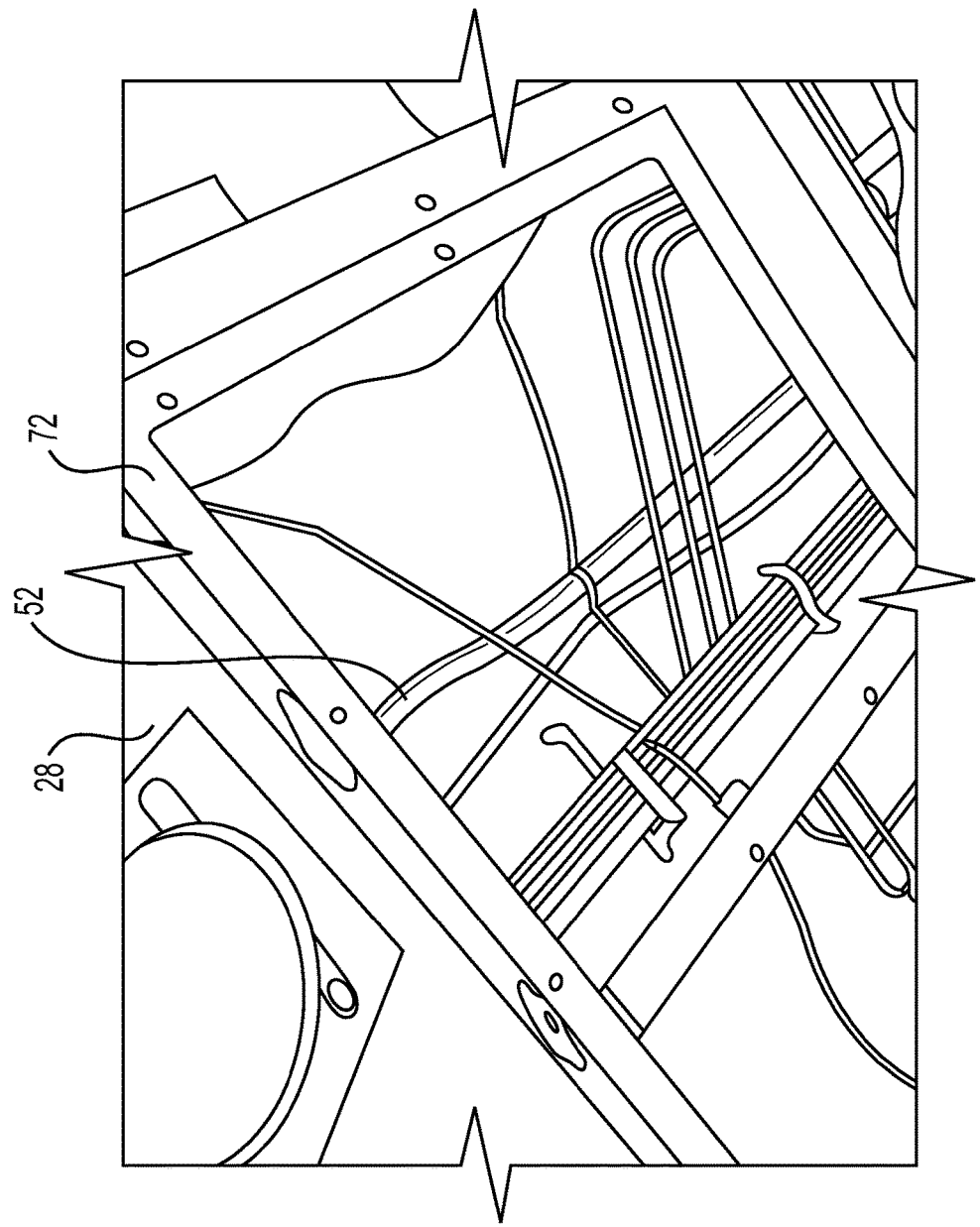
FIG. 7 is a schematic view of another portion of the drain hose of FIG. 6, directed behind a panel located along a side of the cargo compartment in the aircraft.
Figure 8:
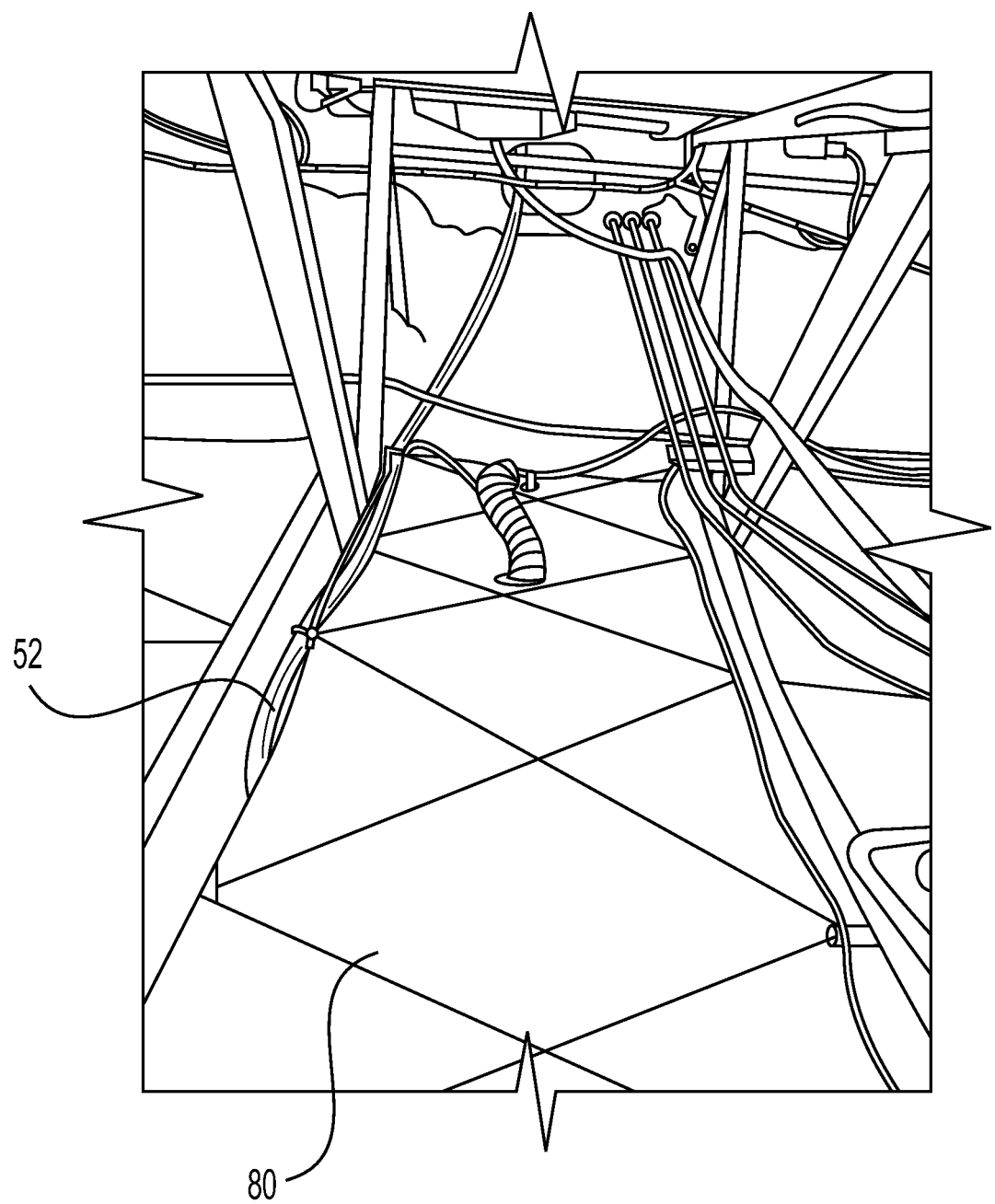
FIG. 8 is a schematic view of a still further portion of the drain hose of FIGS. 6 and 7, directed along a belly of a fuselage of the aircraft.
Figure 9:
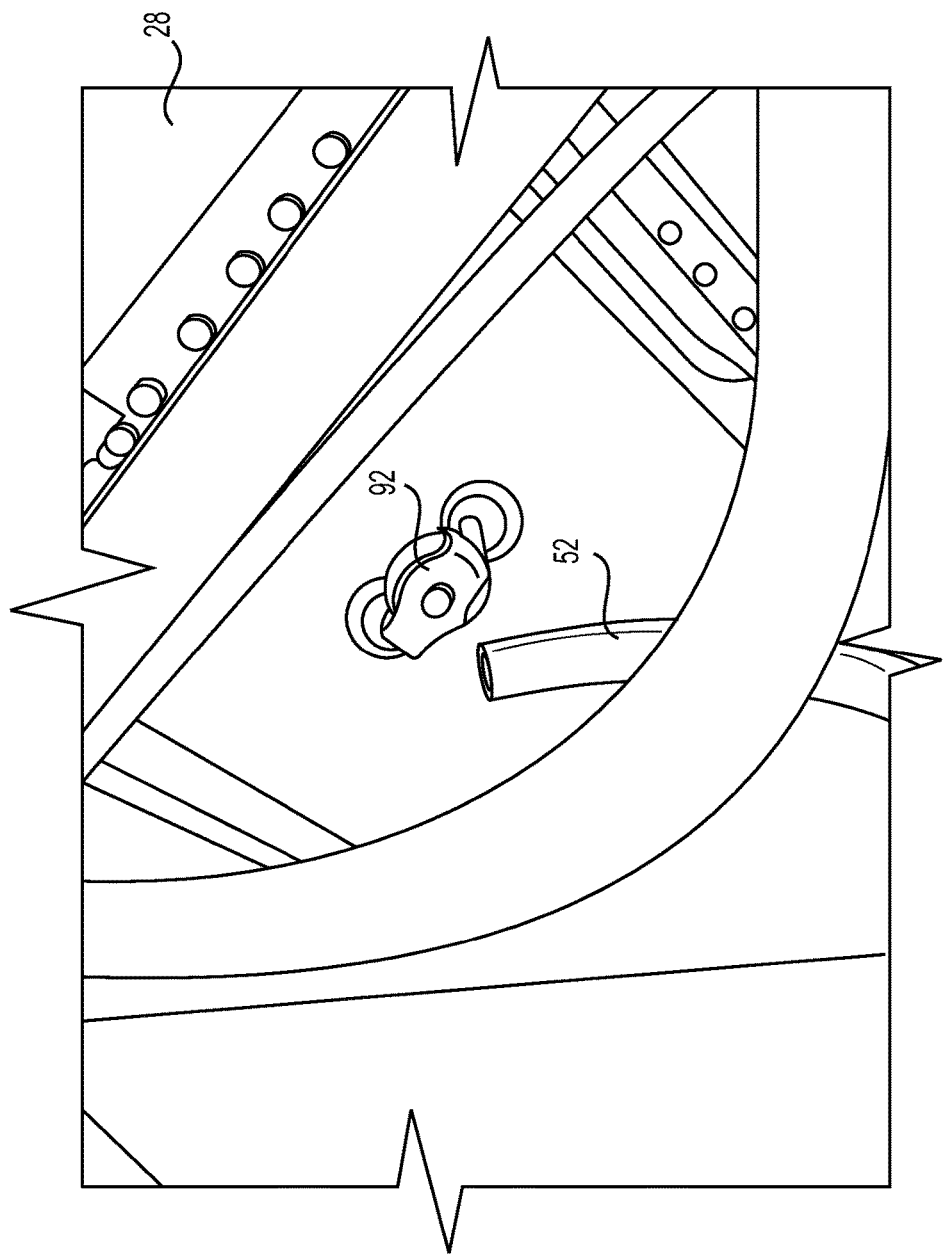
FIG. 9 is a schematic view of a terminal end of the drain hose of FIGS. 6, 7, and 8, positioned adjacent a drain port in the belly of the fuselage of the aircraft.

FIGS. 2-5 illustrate an exemplary embodiment of a precipitation receptacle 30 that may be disposed along upper edge 26 of cargo door opening 23 in order to capture and divert precipitation when cargo door 22 is in an open position. Precipitation receptacle 30 may form part of an exemplary aircraft door drainage system according to this disclosure. The aircraft door drainage system may include precipitation receptacle 30 disposed longitudinally along upper edge 26 of cargo door opening. Precipitation receptacle 30 may comprise a rigid member formed from one or more sections. One of ordinary skill in the art will recognize that the term "rigid" may encompass any receptacle configured to retain its shape when mounted to the aircraft without requiring additional structural elements, framework, or stiffening members to hold the receptacle in position and with a shape configured to capture and divert precipitation. The term "rigid" as used herein refers to a self-supporting structure that may be mounted to the aircraft in a desired position and will have sufficient stiffness to retain its shape and position for capturing precipitation and diverting the precipitation to desired drainage points. Precipitation receptacle 30 may be mounted in place along upper edge 26 of cargo door opening 23 by a plurality of brackets 34 spaced along a length of receptacle 30 as shown in FIGS. 4 and 5. Brackets 34 may be configured to connect receptacle 30 to an inside ceiling panel 35 or other structural member of the aircraft.

Precipitation receptacle 30 may be configured to protrude outward from upper edge 26 of cargo door opening 23 into a projected path followed by precipitation falling off of an outer peripheral surface of fuselage 28 of aircraft 20 from locations above, forward, and aft of cargo door opening 23, in between cargo door 22 and fuselage 28 along the hinged interface between the door and the fuselage, and into cargo door opening 23 when cargo door 22 is in an open position, as shown in FIG. 1. Precipitation receptacle 30 may be configured to remain clear of cargo door 22 when the door is closed into cargo door opening 23, as shown in FIGS. 4 and 5.

As shown in FIGS. 2 and 4, a forward end drain hose 54 may be connected to a forward end drain hose connector 41 at a forward end 31 of rigid precipitation receptacle 30 and configured to direct at least a portion of the precipitation collected in the receptacle from the receptacle to an outside of the aircraft. As shown in FIGS. 2 and 5, an aft end drain hose 52 may be connected to an aft end drain hose connector 43 at an opposite, aft end 32 of the receptacle and configured to direct at least a portion of the precipitation collected in the receptacle from the receptacle to the outside of the aircraft.

As shown in the exemplary embodiment of FIGS. 2 and 3, rigid precipitation receptacle 30 may be constructed from a plurality of sections having different cross sectional areas. The plurality of sections may be joined together at joints such as joints 45, 47, and 49 in FIG. 2, using methods that may include riveting, bonding using bonding agents such as epoxies or other adhesives, or other joining techniques such as ultrasonic welding, brazing, etc. Alternatively, in some implementations, the entire rigid precipitation receptacle 30 may be formed as a single, unitary piece. In some exemplary embodiments, the cross sectional areas of each of the sections of receptacle 30 along a length of the receptacle may be determined by an amount and/or flow direction of precipitation that may fall from fuselage 28 of aircraft 20 at a point along upper edge 26 of cargo door opening 23 adjacent that particular section of receptacle 30. For example, as seen in FIGS. 2-5, a middle portion of receptacle 30 adjacent a hinge 14 configured for opening and closing cargo door 22 may comprise a section with a larger cross sectional area than the cross sectional areas of sections 242, 243 on opposite sides of the middle portion. Additionally, receptacle 30 may be contoured along its length with sections such as sections 245 and 247 on opposite ends of the middle portion having reduced cross sectional areas in areas adjacent portions of upper edge 26 of cargo loading opening 23 where precipitation falling from fuselage 28 is naturally directed away from those sections.

Following receptacle 30 from the right-hand side 32 (the aft end of receptacle 30 in the illustrated exemplary embodiment) to the left-hand side 31 (the forward end of receptacle 30 in the exemplary embodiment) in FIGS. 2 and 3, the illustrated exemplary embodiment includes an enlarged cross sectional area aft end section 42 and an enlarged cross sectional area forward end section 44. Aft end section 42 may be joined to or integral with a first middle section 241. First middle section 241 may be joined at a joint 45 to a second middle section 242. Second middle section 242 may be joined to or integral with a third middle section 245. Third middle section 245 may be joined at another joint 47 in a middle portion having an increased cross sectional area to a fourth middle section 247. Fourth middle section 247 may be joined to or integral with a fifth middle section 243. Fifth middle section 243 may be joined to or integral with a sixth middle section 249. Sixth middle section 249 may be joined to a seventh middle section 244 at a joint 49. Finally, in the illustrated exemplary embodiment, seventh middle section 244 may be joined to enlarged cross sectional area forward end section 44. The number of sections, the shapes of each section, and whether the sections are joined together or manufactured as one or more integral portions of receptacle 30 may vary depending on factors such as the particular aircraft being equipped with the aircraft door drainage system, costs, manufacturability, available materials, etc.

Rigid precipitation receptacle 30 of an aircraft drainage system according to various embodiments of this disclosure may be manufactured in one or more sections using one of additive or subtractive manufacturing techniques. The one or more sections may include first section 42, which may be an aft end section located at a first, aft end of receptacle 30, one or more middle sections 241, 242, 243, 244, 245, 247, 249, and a second section 44, which may be a forward end section located at a second, opposite forward end of receptacle 30. Each of the first, aft end section 42 and second, forward end section 44 may be configured with a cross sectional area that may be larger than the cross sectional areas of the one or more middle sections in between the first and second sections. The first and second sections may be configured to flare outward from adjacent sections of the receptacle. The flared configuration of aft end section 42 and forward end section 44 may accommodate a volume of precipitation at the first and second ends of the receptacle that is equal to or greater than a volume of precipitation accumulated along the entire length of the rigid precipitation receptacle. In one exemplary implementation, the size of aft end section 42 and forward end section 44 may be based on an amount of precipitation flowing during a threshold period of time from first and second sections 42, 44 into first, aft end drain hose 52 and second, forward end drain hose 54, respectively. Factors affecting the size of the various sections of receptacle 30 may also include expected amounts of rainfall, the size of cargo door 22 and cargo door opening 23, the size of drain hoses 52, 54, and the expected amount of time during which cargo door 22 may remain in an open position.

In the exemplary embodiment of an aircraft door drainage system according to this disclosure, and as illustrated in FIGS. 2 and 5, an inlet end of first aft end drain hose 52 may be connected to an aft end drain hose connector 43 of first, aft end section 42 at first, aft end 32 of receptacle 30 located at an aft end of cargo door opening 23. As illustrated in FIGS. 2 and 4, an inlet end of forward end drain hose 54 may be connected to a forward end drain hose connector 41 of second, forward end section 44 at forward end 31 of receptacle 30 located at a forward end of cargo door opening 23. Aft end drain hose 52 connected to aft end drain hose connector 43 of aft end section 42 may be directed down along an interior side wall 10 of a cargo compartment in fuselage 28 and along a belly 80 of the cargo compartment, as shown in FIGS. 6-9. In an exemplary implementation, aft end drain hose 52 may be directed to extend from aft end drain hose connector 43 of aft section 42 at the aft end of receptacle 30 behind a composite liner 62 (shown pulled back from an interior side wall 10 in FIG. 6). Composite liner 62 may be configured to cover and protect interior side wall 10 of the cargo compartment of aircraft 20. Aft end drain hose 52 may then be directed behind an interior slant panel 72 (FIG. 7) disposed along interior side wall 10 of the cargo compartment, along a belly 80 (FIG. 8) of fuselage 28 of aircraft 20, and terminating adjacent a drain opening 92 (FIG. 9) disposed near a center, low point of belly 80 of fuselage 28. The exact path along which aft end drain hose 52 may be directed may vary depending on the internal features of the cargo compartment and structural features of the particular aircraft in which the aircraft door precipitation drainage system is being installed. In various exemplary embodiments, the path for aft end drain hose 52 may be chosen in order to avoid directing the hose in any areas where it would be likely to be damaged by cargo or loading equipment during the loading and unloading process, or where any significant changes to the structure of the aircraft would be required.

Figure 11:
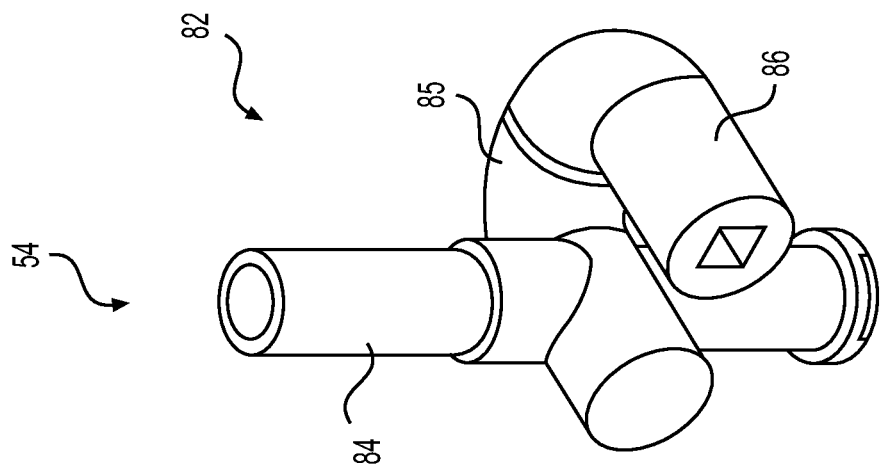
FIG. 11 is an isometric view of a precipitation diverter connector configured to be connected to a terminal end of the drain hose shown in FIG. 10.
Figure 10:
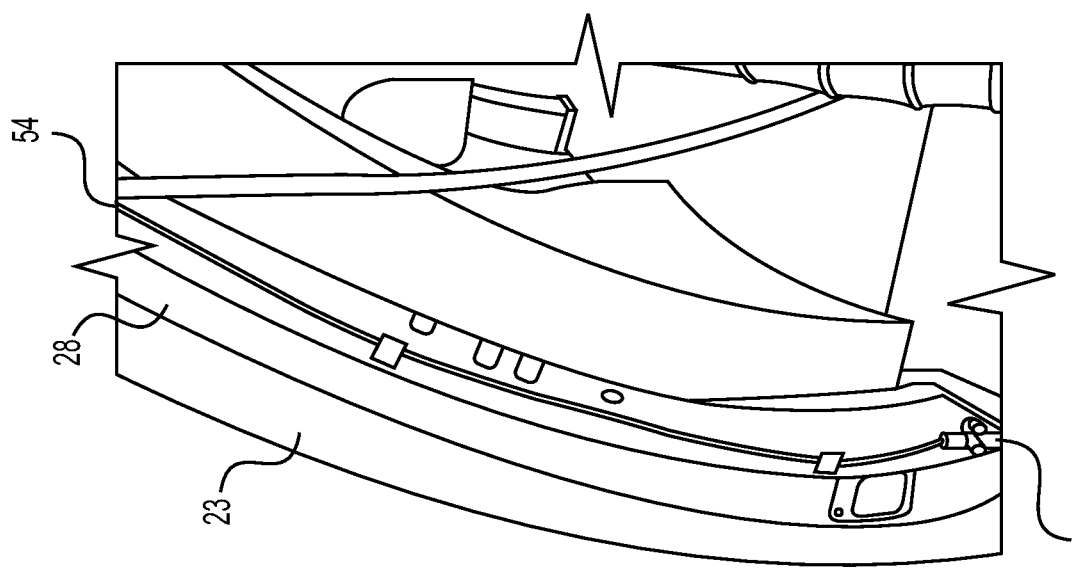
FIG. 10 is a schematic view of another drain hose leading from an opposite end of the precipitation receptacle from the drain hose of FIGS. 6-9.

Forward end drain hose 54 connected to forward end drain hose connector 41 of forward section 44 of receptacle 30 may be directed to extend along a forward side of cargo door opening 23, with an outlet end of forward end drain hose 54 being connected to a precipitation diverter fitting 82 (FIG. 11) at the bottom of cargo door opening 23, as shown in FIG. 10. Precipitation diverter fitting 82 may be configured to direct precipitation flowing through forward end drain hose 54 out through cargo door opening 23 when cargo door 22 is in an open position during loading of the aircraft. Precipitation diverter fitting 82 may also be disposed in a position that is out of the way when cargo door 22 is closed into cargo door opening 23. In the exemplary embodiment of precipitation diverter fitting 82 illustrated in FIG. 11, forward end drain hose 54 may be fitted into a vertical leg 84 of fitting 82, and fitting 82 may include a U-shaped leg 85 configured for redirecting precipitation from a vertical flow path to a horizontal flow path. U-shaped leg 85 may terminate at an outlet end of the fitting, which may be closed with a plug 86. The specific pathways taken by aft end drain hose 52 and forward end drain hose 54, and the configuration of any fittings such as precipitation diverter fitting 82 may vary depending on factors such as the particular aircraft being equipped with an aircraft door precipitation drainage system according to this disclosure, the availability of open pathways through which the drain hoses may be directed without the requirement for significant modifications to the structure of the aircraft, and the availability and accessibility of locations for the drain hoses and fittings that are out of the way and unlikely to be damaged during loading and unloading of cargo from the aircraft.

INDUSTRIAL APPLICABILITY

The aircraft door precipitation drainage system according to various exemplary embodiments of this disclosure provides a readily adaptable solution for preventing precipitation from entering a cargo door opening in an aircraft during loading and unloading of cargo from the aircraft. The disclosed embodiments may be easily installed on existing aircraft without significant structural modifications to the aircraft. The disclosed system and methods may enable production of a reconfigurable, rigid precipitation receptacle in the form of a gutter that may be readily configured and attached to an aircraft along an upper edge of a cargo door opening for the purpose of capturing and diverting precipitation that would otherwise enter the cargo door opening during loading and unloading of the aircraft.

In a disclosed exemplary embodiment, rigid precipitation receptacle 30 may be connected along upper edge 26 of cargo door opening 23 in aircraft 20. The curvature of the outer peripheral surface of fuselage 28 may result in a significant amount of precipitation flowing along the outer peripheral surface and into cargo door opening 23 along a hinged interface between cargo door 22 and fuselage 28 at upper edge 26 of cargo door opening 23.

As shown in FIGS. 4 and 5, rigid precipitation receptacle 30 may be attached along upper edge 26 by a plurality of brackets 34 extending between receptacle 30 and ceiling panels or other structural members located along a top of a cargo compartment. The curvature of the outer peripheral surface of fuselage 28 may allow for the installation of rigid precipitation receptacle 30 with the receptacle protruding into a path of precipitation that flows off of fuselage 28 into the hinged interface between cargo door 22 and fuselage 28 when cargo door 22 is in an open position during loading and unloading of aircraft 20. The precipitation receptacle may be positioned such that it may capture and divert precipitation while cargo door 22 is in an open position, and is also out of the way of cargo door 22 when cargo door 22 is closed into cargo door opening 23.

One exemplary implementation of a method for fabricating rigid precipitation receptacle 30 for use with an aircraft door precipitation drainage system according to this disclosure is described below. Although the described method, and the above-described structure includes interconnected sections having different cross sectional areas, alternative implementations may include forming the entire rigid precipitation receptacle in one piece by molding, additive manufacturing such as 3D printing, or other fabrication processes for forming alternative embodiments of rigid precipitation receptacle 30 as a single piece or as fewer or a greater number of sections than illustrated in the disclosed exemplary embodiment of FIGS. 2 and 3.

Disclosed rigid precipitation receptacle 30 or individual sections 42, 44, 241, 242, 243, 244, 245, 247, 249 of rigid precipitation receptacle 30 may be manufactured using conventional techniques such as, for example, casting or molding. Alternatively, precipitation receptacle 30 or one or more individual sections of the receptacle may be manufactured using techniques generally referred to as additive manufacturing or additive fabrication. Additive manufacturing/fabrication processes include techniques such as, for example, 3D printing. 3D printing is a process wherein material may be deposited in successive layers under the control of a computer. The computer controls additive fabrication equipment to deposit the successive layers according to a three-dimensional model (e.g. a digital file such as an AMF or STL file) that is configured to be converted into a plurality of slices, for example substantially two-dimensional slices, that each define a cross-sectional layer of the precipitation receptacle 30 in order to manufacture, or fabricate, the precipitation receptacle. In one case, the disclosed precipitation receptacle 30 would be an original component and the 3D printing process would be utilized to manufacture the precipitation receptacle. In other cases, the 3D process could be used to replicate an existing precipitation receptacle and the replicated precipitation receptacle could be sold as aftermarket parts. These replicated aftermarket precipitation receptacles could be either exact copies of the original precipitation receptacle or pseudo copies differing in only non-critical aspects.

Figure 12:
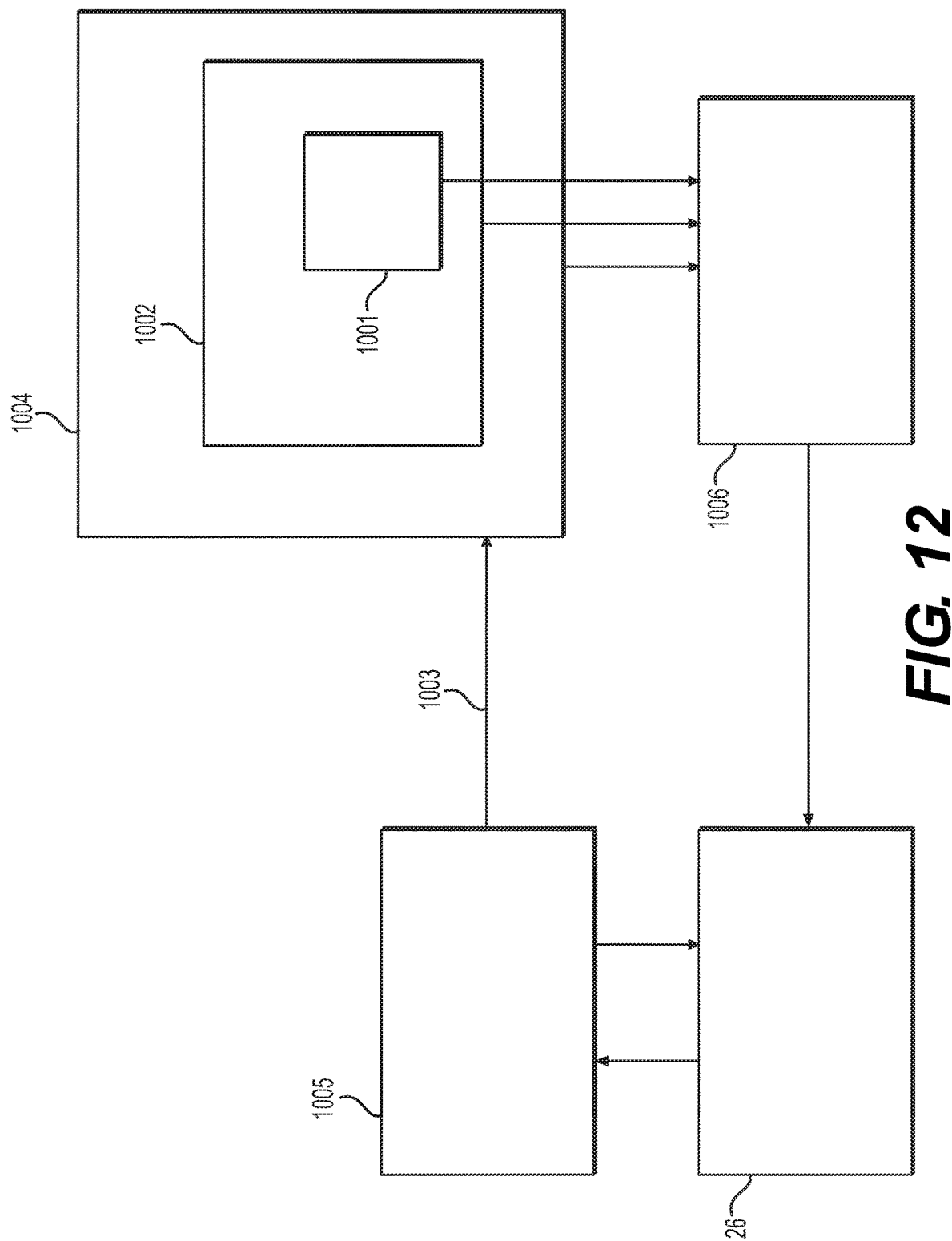
FIG. 12 is a block diagram illustrating an exemplary system for producing the precipitation receptacle of FIGS. 2 and 3 using an additive manufacturing process.

With reference to FIG. 12, a three-dimensional model 1001 used to represent an original precipitation receptacle 30 or a section 42, 241, 242, 243, 244, 245, 247, 249, 44 of an original precipitation receptacle 30 may be on a computer-readable storage medium 1002 such as, for example, magnetic storage including floppy disk, hard disk, or magnetic tape; semiconductor storage such as solid state disk (SSD) or flash memory; optical disc storage; magneto-optical disc storage; or any other type of physical memory on which information or data readable by at least one processor may be stored. This storage medium may be used in connection with commercially available 3D printers 1006 to manufacture, or fabricate, the precipitation receptacle. Alternatively, the three-dimensional model may be transmitted electronically to the 3D printer 1006 in a streaming fashion without being permanently stored at the location of the 3D printer 1006. In either case, the three-dimensional model constitutes a digital representation of the precipitation receptacle 30 suitable for use in manufacturing the precipitation receptacle.

The three-dimensional model may be formed in a number of known ways. In general, the three-dimensional model is created by inputting data 1003 representing the precipitation receptacle 30 to a computer or a processor 1004 or to a cloud-based software operating system. The data may then be used as a three-dimensional model representing the physical precipitation receptacle. The three-dimensional model is intended to be suitable for the purposes of manufacturing the precipitation receptacle. In an exemplary embodiment, the three-dimensional model is suitable for the purpose of manufacturing the precipitation receptacle by an additive manufacturing technique.

In one embodiment depicted in FIG. 12, the inputting of data may be achieved with a 3D scanner 1005. The method may involve contacting the precipitation receptacle 30 via a contacting and data receiving device and receiving data from the contacting and data receiving device in order to generate the three-dimensional model. For example, 3D scanner 1005 may be a contact-type scanner. The scanned data may be imported into a 3D modeling software program to prepare a digital data set. In one embodiment, the contacting may occur via direct physical contact using a coordinate measuring machine that measures the physical structure of the precipitation receptacle or a section of the precipitation receptacle by contacting a probe with the surfaces of the precipitation receptacle in order to generate a three-dimensional model. In other embodiments, the 3D scanner 1005 may be a non-contact type scanner and the method may include directing projected energy (e.g. light or ultrasonic) onto the precipitation receptacle to be replicated and receiving the reflected energy. From this reflected energy, a computer may generate a computer-readable three-dimensional model for use in manufacturing the precipitation receptacle. In various embodiments, multiple 2D images can be used to create a three-dimensional model. For example, 2D slices of a 3D object can be combined to create the three-dimensional model. In lieu of a 3D scanner, the inputting of data may be done using computer-aided design (CAD) software. In this case, the three-dimensional model may be formed by generating a virtual 3D model of the disclosed precipitation receptacle using the CAD software. A three-dimensional model may be generated from the CAD virtual 3D model in order to manufacture the precipitation receptacle.

The additive manufacturing process utilized to create the disclosed precipitation receptacle 30 may involve materials such as plastic, rubber, metal, etc. In some embodiments, additional processes may be performed to create a finished product. Such additional processes may include, for example, one or more of cleaning, hardening, heat treatment, material removal, and polishing. Other processes necessary to complete a finished product may be performed in addition to or in lieu of these identified processes.

It will be apparent to those skilled in the art that various modifications and variations can be made to the structure and methodology described herein. Thus, it should be understood that the invention is not limited to the subject matter discussed in the specification. Rather, the present invention is intended to cover modifications and variations that fall within the scope of the claims.

What is claimed is:

1. An aircraft door precipitation drainage system, comprising:
   a precipitation receptacle configured to be disposed and mounted in place in a fixed position relative to an aircraft longitudinally along an upper edge of an aircraft door opening in the aircraft;
   a plurality of brackets spaced along a length of the precipitation receptacle and configured to connect and hold the precipitation receptacle in the fixed position mounted to an inside ceiling panel of the aircraft, the precipitation receptacle being configured to:
   protrude outward in a direction with at least one of a horizontal directional component and a vertical directional component from the upper edge of the aircraft door opening into a projected path followed by precipitation falling off of an outer peripheral surface of a fuselage of the aircraft when an aircraft door configured to be connected by a hinge along the upper edge of the aircraft door opening is in an open position, and
   remain out of the way of the aircraft door when the aircraft door is in a closed position; and
   at least one drain hose configured to be connected at one of a first end or a second end of the precipitation receptacle and configured to direct at least a portion of the precipitation collected in the precipitation receptacle to an outside of the aircraft.

2. The aircraft door precipitation drainage system of claim 1, wherein the precipitation receptacle is a rigid member including a plurality of sections having different cross sectional areas.

3. The aircraft door precipitation drainage system of claim 2, wherein adjacent sections of the plurality of sections are joined together by at least one of rivets, adhesives, bonding, or welding.

4. The aircraft door precipitation drainage system of claim 1, wherein the precipitation receptacle is manufactured in one or more sections using one of additive or subtractive manufacturing techniques.

5. The aircraft door precipitation drainage system of claim 4, wherein the one or more sections include a first section at the first end of the precipitation receptacle, one or more middle sections, and a second section at the second end of the precipitation receptacle, wherein each of the first and second sections is configured with a cross sectional area that is larger than cross sectional areas of the one or more middle sections.

6. The aircraft door precipitation drainage system of claim 5, wherein the first and second sections are configured to flare outward from adjacent sections of the precipitation receptacle, the first and second sections having a cross sectional area configured to accommodate a volume of precipitation at the first and second ends of the precipitation receptacle that is equal to or greater than a volume of precipitation accumulated along the entire length of the precipitation receptacle during a threshold period of time.

7. The aircraft door precipitation drainage system of claim 1, wherein the at least one drain hose includes a first drain hose and a second drain hose and an inlet end of the first drain hose is configured to be connected to the first end of the precipitation receptacle at a forward end of the aircraft door opening and an inlet end of the second drain hose is configured to be connected to the second end of the precipitation receptacle at an aft end of the aircraft door opening.

8. The aircraft door precipitation drainage system of claim 7, wherein the first drain hose is configured to extend along a forward side of the aircraft door opening and an outlet end of the first drain hose is configured to be connected to a precipitation diverter fitting configured to direct the precipitation flowing through the first drain hose out through the aircraft door opening.

9. The aircraft door precipitation drainage system of claim 7, wherein the second drain hose is configured to extend from the second end of the precipitation receptacle, along an interior wall of the cargo compartment, along a belly of the fuselage of the aircraft, and configured to terminate adjacent a drain opening disposed near a center of the belly of the fuselage.

10. A precipitation gutter for an aircraft door opening in an aircraft, the precipitation gutter comprising:
    a receptacle configured to be disposed and mounted in place in a fixed position relative to the aircraft longitudinally along an upper edge of the aircraft door opening; and
    a plurality of brackets spaced along a length of the receptacle and configured to connect and hold the receptacle in the fixed position mounted to an inside ceiling panel of the aircraft, the receptacle being configured to:
    protrude outward in a direction with at least one of a horizontal directional component and a vertical directional component from the upper edge of the aircraft door opening into a projected path followed by precipitation falling off of an outer peripheral surface of a fuselage of the aircraft when an aircraft door connected by a hinge along the upper edge of the aircraft door opening is in an open position, and remain out of the way of the aircraft door when the aircraft door is in a closed position.

11. The precipitation gutter of claim 10, wherein the receptacle includes a plurality of sections having different cross sectional areas.

12. The precipitation gutter of claim 11, wherein the plurality of sections comprise rigid members and adjacent sections of the plurality of sections are joined together by at least one of rivets, adhesives, bonding, or welding.

13. The precipitation gutter of claim 10, wherein the receptacle is manufactured in one or more sections using one of additive or subtractive manufacturing techniques.

14. The precipitation gutter of claim 13, wherein the one or more sections include a first section at a first end of the receptacle, one or more middle sections, and a second section at a second end of the receptacle, wherein each of the first and second sections is configured with a cross sectional area that is larger than the cross sectional areas of the one or more middle sections.

15. The precipitation gutter of claim 14, wherein the first and second sections are configured to flare outward from adjacent sections of the receptacle, the first and second sections having a cross sectional area configured to accommodate a volume of precipitation at the first and second ends of the receptacle that is equal to or greater than a volume of precipitation accumulated along the entire length of the precipitation receptacle during a threshold period of time.

16. The precipitation gutter of claim 10, wherein a first end of the receptacle is configured to be located at a forward end of the upper edge of the aircraft door opening and includes a first drain hose connector configured for connection to a forward drain hose configured for draining precipitation from the first end of the receptacle, and a second end of the receptacle is configured to be located at an aft end of the upper edge of the aircraft door opening and includes a second drain hose connector configured for connection to an aft drain hose configured for draining precipitation from the second end of the receptacle.

17. An aircraft, comprising:
a cargo door opening in a side of a fuselage of the aircraft;
a cargo door connected along a hinged interface including at least one hinge interconnecting the cargo door and an upper edge of the cargo door opening and configured to close and open the cargo door opening; and
a precipitation drainage system attached to the cargo door opening, the precipitation drainage system comprising:
a precipitation receptacle disposed and mounted in place in a fixed position relative to the aircraft longitudinally along an upper edge of the cargo door opening;
a plurality of brackets spaced along a length of the precipitation receptacle and configured to connect and hold the precipitation receptacle in the fixed position relative to an inside ceiling panel of a cargo compartment of the aircraft, the precipitation receptacle being configured to:
protrude outward in a direction with at least one of a horizontal directional component and a vertical directional component from the upper edge of the cargo door opening into a projected path followed by precipitation falling off of an outer peripheral surface of the fuselage of the aircraft along the hinged interface when the cargo door is in an open position, and
remain out of the way of the cargo door when the cargo door is in a closed position; and
at least one drain hose connected at one of a first end or a second end of the precipitation receptacle and configured to direct at least a portion of the precipitation collected in the precipitation receptacle to an outside of the aircraft.

18. The aircraft of claim 17, wherein the precipitation receptacle includes a plurality of sections having different cross sectional areas, the plurality of sections including a first section at the first end of the precipitation receptacle, one or more middle sections, and a second section at the second end of the precipitation receptacle, wherein each of the first and second sections is configured with a cross sectional area that is larger than cross sectional areas of the one or more middle sections.

19. The aircraft of claim 18, wherein adjacent sections of the plurality of sections are joined together by at least one of rivets, adhesives, bonding, or welding.

20. The aircraft of claim 17, wherein the precipitation receptacle is manufactured in one or more sections using one of additive or subtractive manufacturing techniques.

* * * * *